United States Patent [19]

Bannon et al.

[11] 4,247,368
[45] Jan. 27, 1981

[54] APPARATUS FOR DISTILLATION COLUMN SIDE STREAM WITHDRAWAL

[75] Inventors: Robert P. Bannon, Houston, Tex.; Johan H. DeBie, Alphen aan de Rijn, Netherlands

[73] Assignee: Shell Oil Company, Houston, Tex.

[21] Appl. No.: 97,023

[22] Filed: Nov. 23, 1979

Related U.S. Application Data

[63] Continuation-in-part of Ser. No. 946,886, Sep. 28, 1978, abandoned.

[51] Int. Cl.³ .............................................. B01D 3/42
[52] U.S. Cl. ................................... 202/158; 202/181; 203/1; 203/98; 203/DIG. 19
[58] Field of Search ............... 202/158, 181, 161, 160; 261/114 R; 203/1, DIG. 19, 99, 2, 98, DIG. 18

[56] References Cited

U.S. PATENT DOCUMENTS

| | | | |
|---|---|---|---|
| 1,865,400 | 6/1932 | McConnell | 202/161 |
| 2,048,576 | 7/1936 | Stone | 202/161 |
| 2,254,182 | 8/1941 | Kraft | 203/2 |
| 2,646,392 | 7/1953 | Gerhold | 202/158 |
| 2,795,536 | 6/1957 | Grossberg et al. | 202/158 |
| 3,003,929 | 10/1961 | Bright | 203/DIG. 19 |
| 3,053,521 | 9/1962 | Plaster | 202/158 |
| 3,322,136 | 5/1967 | Matta | 202/181 |

Primary Examiner—Wilbur L. Bascomb, Jr.

[57] ABSTRACT

An apparatus is described for use in combination with a conventional distillation column to provide for measurement and control of reflux flow from a column intermediate fractionation stage at which a liquid side stream draw is taken. The apparatus comprises liquid receiver, flow control, and flow metering elements of particular description, and of particular relative position.

9 Claims, 4 Drawing Figures

APPARATUS FOR DISTILLATION COLUMN SIDE STREAM WITHDRAWAL

This application is a continuation-in-part of copending application Ser. No. 946,886, filed Sept. 28, 1978 now abandoned.

BACKGROUND OF THE INVENTION

The present invention relates to an apparatus for monitoring and controlling the operation of a distillation column. More specifically, the invention relates to an apparatus for division of a liquid stream within the column into a side stream and a reflux of metered and controlled flowrate.

Separation of a fluid mixture into various component fractions according to relative boiling points or boiling point ranges may be accomplished by fractional distillation, generally carried out in a vertical column containing trays or beds of packing material which effect intimate contact between the vapor flowing up through the column and the liquid flowing down. Such distillation columns yield an overhead product consisting of a lower boiling fraction and a bottoms product of a higher boiling fraction. In addition, it is often desired to remove one or more intermediate boiling fractions as side streams from intermediate locations in the column. When a liquid side stream withdrawal is made, it usually comprises only a part of the liquid flow in the tower at the point of withdrawal. In this situation of partial withdrawal, the remainder of the liquid passes to the fractionation stages of the column below the side stream draw as a reflux to maintain liquid-vapor contact and effect efficient fractionation in this portion of the column.

In order to take such a partial side stream draw, it is necessary to accomplish a division of a liquid flow within the column into a side stream and a reflux. Since the reflux liquid remains within the distillation process and influences its operation, it is often advantageous to make this division in a manner which allows both measurement and control of reflux flowrate. Additionally, it is most desirable that the measurement and control functions be carried out in a manner such that no more of a hydraulic driving force is required than that which is normally available for gravity flow of liquid from the point of side stream draw to the next lower fractionation stage. Operating within the constraints of gravity flow obviates the need for the pumping of reflux flow through metering and control devices, a common conventional practice.

At least one such device has been proposed for use in dividing a liquid flow into side stream and reflux which also accomplishes metering of the reflux flowrate. The invention disclosed in U.S. Pat. No. 2,254,182 to W. W. Kraft is directed to an apparatus comprising a chamber for collecting the total liquid traffic down the column at the point of the desired partial side stream draw. Reflux and side stream flow continuously out of the chamber, each through one of two outlets. The reflux outlet consists of a calibrated orifice located on the bottom of the chamber. Since flow through the orifice is dependent in a known manner upon liquid head above the orifice, monitoring of liquid level in the chamber provides indirect measurement of reflux flowrate.

It is further known that the concept of flow measurement illustrated by U.S. Pat. No. 2,254,182 can be adapted to provide some degree of reflux flow control. For instance, if a given constant flow of reflux is desired, the side stream flowrate could, in theory, be varied as necessary to provide a given constant liquid level in the chamber and thus a constant flow through the chamber orifice. However, such indirect control logic has, in practice, proven unsuccessful for providing stable control of reflux flow for the reason that liquid traffic through a distillation column is generally characterized by continual fluctuations in flowrate. Such fluctuations are variable, both as to amplitude and frequency, in a manner which does not permit a response of side stream control which is adequate to prevent these fluctuations from being reflected in the chamber liquid level and hence in the reflux flowrate. In essence, the particular control logic fails in this application because it is unable to reproduce the variations in liquid traffic with identical corresponding variations in side stream flow. As a consequence, minor upsets and normal variations in the distillation process above the side draw tray are communicated to the lower sections of the column through variations in reflux flow.

An additional shortcoming of many conventional metering chamber devices is their inability to adapt to substantial changes in the operation of the column. Both metering and control functions of prior art devices are accomplished by the same orifice, calibrated for operation under a given mode of column operation. Over the long term, major changes in the distillation process, involving, for instance, variation in feed flowrate, feed composition, or side stream flowrate, will necessitate a shutdown of column operations for replacement of the orifice in order that it will function adequately in the new mode of operation.

SUMMARY OF THE INVENTION

The instant invention offers a solution to the aforementioned problems. The invention provides an apparatus which achieves division of a liquid source within a distillation column into a side stream portion for withdrawal from the column through a withdrawal outlet and a metered and controlled reflux portion which passes by gravity flow to a column fractionation stage below the withdrawal outlet. The division is such that the reflux flowrate is not influenced by ordinary fluctuations in flowrate of the liquid source. Furthermore, use of the apparatus of the invention permits continued control of reflux flowrate during periods when the column is operating in a mode significantly different than that for which it was designed. These advantages are realized in accord with the use of the invention without the need for pumping of reflux flow.

In its most general aspects, the apparatus of the invention entails, in combination with a multi-stage countercurrent distillation column having an upper fractionation stage above a withdrawal outlet for use in withdrawing a liquid side draw from the column and a lower fractionation stage below said withdrawal outlet, an apparatus, for dividing a liquid source into a reflux portion of measured and controlled flowrate that passes by gravity flow to the lower fractionation stage, and a side stream portion that is withdrawn from the distillation column through said withdrawal outlet, which apparatus comprises (a) a liquid reflux reservoir adapted to collect said liquid source, said reservoir positioned at an elevation intermediate to that of the upper and the lower fractionation stages, said reflux reservoir having in association therewith (b) means for maintaining a liquid level within the reflux reservoir, said reflux reservoir being in liquid communication with said withdrawal outlet via (c) flow passage means adapted to direct the side stream portion of the liquid source to the withdrawal outlet, and said reflux reservoir being in liquid communication, through (d) first liquid conduit means, with (e) control valve means adapted to pass a controlled flowrate of said reflux portion of the liquid source, via (f) second liquid conduit means, to (g) a metering chamber positioned at an elevation below the reflux reservoir, said chamber having (h) at least one flow orifice through which passes the reflux portion to the lower fractionation stage, and said chamber having in association therewith (i) liquid level measuring means for monitoring of liquid level in the chamber.

The apparatus of the invention, having elements arranged in the critical manner described, provides for a more stable and precise control of a gravity flow of reflux than was heretofore practiced. The control system does not attempt to respond to the fluctuations in column liquid traffic so as to reproduce these same fluctuations in side stream flow. Instead, the control function provided by the invention operates in a manner essentially independent of the influence of such fluctuations.

DESCRIPTION OF THE PREFERRED EMBODIMENTS

The apparatus comprises three principal elements, in combination with a distillation column containing a plurality of fractionation stages and a side stream withdrawal outlet. The three elements are necessarily interconnected with conduit means for reflux liquid flow and positioned in such a manner that the reflux flow passes, by action of gravity, sequentially to each of the elements in a precise order.

Uppermost of the elements of the apparatus is a reflux reservoir adapted to collect a liquid source within the distillation column at an intermediate location in the column from which a side stream withdrawal is desired. The liquid source may suitably comprise all or part of the liquid traffic flowing through the fractionation stages and down the column and/or other liquid streams entering into the distillation process within the column, e.g., a feed stream or a liquid stream which has been removed from the process for heat transfer purposes and is then returned to the column. Positioned downstream from the reflux reservoir, with respect to direction of reflux flow, is the second principal element of the invention, a control valve means. Located downstream of the control valve means, the third principal element is a metering chamber incorporating one or more flow orifices which in effect translate a flowrate parameter into a more readily determinable liquid level or, equivalently, a differential pressure parameter. While the reflux reservoir and metering chamber elements can conceivably be, at least in part, located external to the column, it is preferred that they be located within the column walls. As will be illustrated below, through reference to the drawing, these elements can, in many instances, be arranged within the column in a manner which necessitates the use of no more internal column space than is normally provided for conventional means for side stream withdrawal. The control valve means is preferably located external to the column.

The apparatus of the invention is intended to be applied in combination with a distillation column of conventional design. As the invention generally provides for side stream withdrawal from a distillation column, it is to be understood that the column comprises at least one fractionation stage both above and below the relative vertical position of a side stream withdrawal outlet. Fractionation stage, as the term is used here, is intended to apply broadly to any conventional means for effecting vapor-liquid contact within a distillation column, common examples of which are one or more valve trays, sieve trays, packed column sections, or the like.

The reflux reservoir employed as an element of the apparatus of the invention may be of any convenient design which is adapted to collect the liquid source that is to undergo division into reflux and side stream. Associated with the reflux reservoir are means for maintaining a liquid level, preferably an essentially constant liquid level, in the reservoir. Reflux reservoir liquid serves both as surge capacity to dampen fluctuations in the flow of the liquid source and as a supply of the necessary hydraulic head for flow of reflux through other elements of the apparatus of the invention. Level is maintained through release of quantities of the liquid source from the reservoir as side stream, which quantities represent the excess of the collected flow of the liquid source over that necessary to supply the reflux called for by the control element of the apparatus. In this manner, the liquid level maintaining means provides for division of the liquid source into reflux and side stream. A weir, which may be, for instance, simply formed by a wall of the reflux reservoir, is a preferred means for maintaining the necessary liquid level in the reservoir, though more complex liquid level control instruments may be used to regulate release of side stream from the reflux reservoir. For example, the liquid level maintaining means may suitably comprise a side stream control valve in a side stream flow passage means external to the column and a reflux reservoir liquid level measuring means, inter-connected with the control valve by conventional control instrumentation, so that the side stream control valve will open and close to release such quantities of side stream from the reservoir as are necessary to maintenance of an essentially constant liquid level therein.

Flow passage means direct the released side stream flow through the withdrawal outlet from the column. When a weir is utilized to maintain liquid level in the reflux reservoir, the flow passage means preferably comprises a side stream reservoir, distinct from the reflux reservoir, as well as a means for communicating liquid from the side stream reservoir to the side stream withdrawal outlet. This side stream reservoir functions to maintain within the column a liquid surge capacity for side stream which is independent of that for reflux and which operates in generally the same manner as conventional side stream draw trays.

The apparatus comprises a first conduit means to route reflux from the reflux reservoir to the control valve or like control means, located at a vertical elevation below the reflux reservoir so as to permit gravity flow. The control valve may be operated manually or automatically in response to signals from appropriate instruments provided for maintenance of a desired distillation process parameter, for example, temperature on the fractionation stage below the metering chamber, flowrate of reflux through the metering chamber, etc. It is necessary that the control valve be specified so as to operate under the relatively low differential pressure provided by the gravity flow of the reflux from the reflux reservoir to the metering chamber. Normal tray spacing in a trayed distillation column, i.e., about two feet, will generally provide sufficient driving force for operation of a control valve. As a practical matter it is advisable that the control valve be physically located at a relative vertical elevation no higher than that of the metering chamber liquid level, in order to prevent flashing of reflux liquid to a vapor/liquid mixture downstream of the valve. A preferred embodiment of the invention involves the arrangement of the control function so that the valve automatically provides constant reflux flowrate in response to signals generated by the liquid level measuring means associated with the metering chamber element.

A second conduit means is provided for communicating reflux liquid from the control valve into the metering chamber. The metering chamber element of the invention generally comprises a box of any convenient shape. The chamber is equipped with an inlet opening for interconnection with the second conduit means from the control valve and with one or more outlet openings, in the form of flow orifices, for the flow of reflux to a fractionation stage below the side stream outlet. Since the flow into the chamber is controlled and the flow out of the chamber is metered, and further since it is desired to meter and control the same flow, it is critical that provision be made in the design of the chamber and in its positioning within the column, if it is situated therewithin, to prevent liquid from otherwise being communicated into or out of the chamber during normal operation of the apparatus. Attention to this feature of the apparatus is of importance since it is further generally desirable that the chamber have some opening at or near the top to permit renting vapor to freely enter and exit the chamber vapor space. Suitably, a cover may be provided over any such openings.

The one or more outlet flow orifices are provided in one or more of the chamber walls. While the apparatus will be operable if some or all of the orifices are located on or near the bottom of the chamber, a wider range of effective flow measurement may generally be obtained if the orifice or orifices extend substantially across the full vertical dimension of one or more chamber side walls. Through appropriate sizing and vertical positioning of the orifices, it is possible to obtain essentially any desired functional relationship between measured liquid level in the chamber and flowrate of reflux liquid out of the chamber through the orifices. Liquid level measuring means in association with the chamber are suitably of any one of the many types of conventional devices known for such service, for instance, liquid float, sight glass, or differential pressure instrumentation.

It is considered advantageous that the invention, in certain narrow embodiments, can be readily adapted for use in distillation column designs conventionally used for purposes of side stream withdrawal. It will be recognized that a very common liquid source for division into reflux and sidestream is all liquid flowing down a distillation column at the location of desired side stream withdrawal. Heretofore, when it was desired to divide this liquid into a side stream and a metered and controlled reflux flow it was necessary to collect and remove the liquid from the column and then to pump reflux back to the column through conventional metering and control instruments. Within the column a receiver, for instance a chimney type draw tray, was provided to accomplish collection of the liquid at a location for a side stream withdrawal, and also to act as a side stream reservoir maintaining a surge capacity of sidestream draw. Such receivers as have been traditionally used for this service can be readily adapted to serve as reflux reservoirs for purposes of the instant invention.

According to a preferred adaptation in this regard, of a sort illustrated in the Figures a receiver in the form of a common conventional draw tray is provided with two outlets, one for reflux and one for side stream. The receiver is also equipped with a vertical reflux weir running transversely across the tray pan and between the two outlets to divide the tray into two liquid reservoirs—a reflux reservoir and a side stream reservoir. Liquid down-flowing through the fractionation stages of the column is collected by this receiver. At least a portion of the liquid entering the receiver, said portion being of greater flowrate than the reflux, is directed to one side of the weir and into the reflux reservoir which is in communication, according to the invention, with the control valve means through the first liquid conduit means. That portion of the liquid which enters the reflux reservoir but which is not taken under control through the reflux outlet, overflows the reflux weir to the second, side stream reservoir. In order to assure that a liquid level is maintained in the reflux reservoir, the liquid directed to the reflux reservoir must necessarily be of greater time-averaged flowrate than the reflux which is drawn from the reflux reservoir. While it is possible to direct only a portion of the liquid to the reflux reservoir, it is generally desirable that the total liquid flowing down the column enter the reflux reservoir. Any entering liquid not directed to the reflux reservoir of the receiver passes, in operation of this embodiment of the invention, directly to the side stream reservoir. Division of the liquid flow in the column in such a manner that a portion enters the reflux reservoir and the remainder enters the side stream reservoir would perhaps be desirable, for instance, when multipass trays with multiple downcomers are employed as column fractionation stages and when the requirements of reflux flowrate can easily be met by that portion of the total liquid collected from fewer than all of the passes.

The side stream reservoir, in communication with the side stream outlet, is maintained at a liquid level below the top of the reflux weir under normal operation of this preferred embodiment of the apparatus of the invention. An essentially constant level source of liquid is thus provided upstream of the weir, in the reflux reservoir. If desired, liquid level in the side stream reservoir may be monitored by means of conventional liquid level instrumentation, and flowrate of side stream withdrawal may be controlled to maintain a liquid level in the side stream reservoir. Alternatively, side stream liquid may be allowed to drain freely from the side stream reservoir. A means for liquid communication is provided for routing of the side stream liquid from the side stream reservoir to the side stream outlet. In embodiments of the invention in which the side stream reservoir is in direct contact with the outlet, the reservoir itself serves as a means to channel side stream to the outlet. It is considered most significant that fluctuations in side stream reservoir level and in side stream flowrate are of no concern in the operation of the apparatus of the invention as they have no influence upon the control of the relux flow.

As a practical consideration, it is also desirable that the side stream reservoir of the receiver, in this preferred embodiment, be equipped with an outlet overflow weir and an overflow downcomer to a lower fractionation stage in the column. The overflow weir extends to a height above the normal liquid level in the side stream reservoir. During periods of extreme upset in column operation or of instrument malfunction, when more liquid traffic enters the receiver than is withdrawn as reflux and side steam, the excess liquid overflows the overflow weir and is directed to the lower fractionation stage.

The preferred embodiment of the invention as above described will now be more particularly illustrated with reference to the specific elements of the apparatus shown in the drawing. It is emphasized that the drawings depict only one specific embodiment of the invention. Operative modifications thereto are generally described within the specification, and others will be evident to one skilled in the art.

Figure 1:
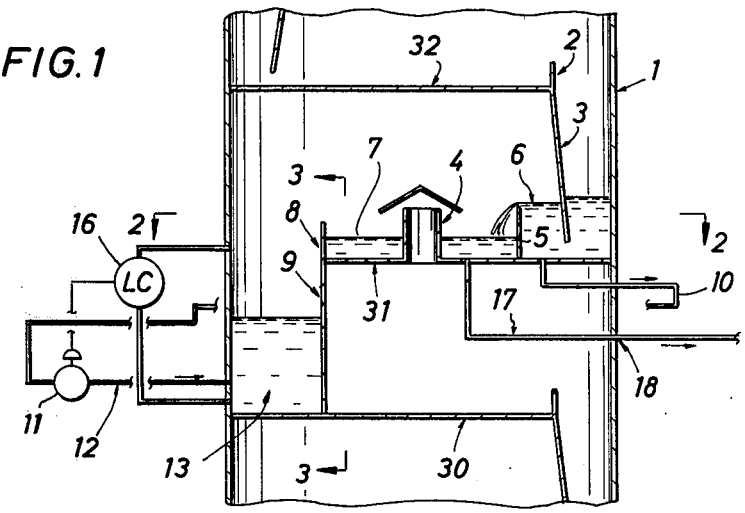
FIG. 1 is a side view of a particular apparatus according to the invention in partial cross section.

Referring to the figures, the cylindrical wall of a distillation column is designated as 1. In the figures, only a portion of the vertically extending column, above and below the receiver, here a conventional draw tray designated 31, is pictured. One single-pass fractionation stage, tray 32, above the reciever, is shown equipped with a weir 2 to maintain liquid level on the tray and a downcomer 3 to direct liquid overflowing the weir to the receiver. Here, tray 32 functions to aid in directing the liquid traffic down the distillation column onto the receiver. The draw tray is supplied with one or more chimneyes 4 to bypass vapor flow upward through the receiver without fractionation contact with liquid thereon. In addition, the receiver is equipped with a reflux weir 5 which divides the tray pan so as to provide two distinct liquid reservoirs. The reflux liquid reservoir upstream of the reflux weir 5, i.e. on the side of the weir in direct communication with liquid from downcomer 3, is generally designated 6, while the side stream reservoir on the other side of the weir is generally designated 7. In operation, liquid flowing from tray 32, through downcomer 3, is collected by reflux reservoir 6. That liquid traffic entering the reflux reservoir 6 on receiver 31 which is not taken as reflux overflows the weir into side stream reservoir 7 from which it is removed as side stream via communication means 17 to side stream withdrawal outlet 18. Means for optional control of side stream reservoir liquid level and of side stream flow through the withdrawal outlet are not shown. The receiver is here further provided with an overflow weir 8 and an overflow downcomer 9, in order that under major upsets in column operation large quantities of liquid traffic may overflow the receiver without the constraint of reflux or side stream control.

Conduit 10, in liquid communication with reservoir 6, runs external to the column to control valve 11. Conduit 12 extends from control valve 11 to an inlet into metering chamber internal space generally designated 13. In the figures, the metering chamber floor is coincident with the deck of tray 30, the fractionation stage below the receiver. The chamber is further defined by at least three vertical walls, two of which are, in the figures, the column wall 1 and the receiver overflow downcomer 9. One or more of the vertical walls, here the single wall 14, contain a flow orifice, here in the form of a rectangular vertical slit 15 extending across substantially the full vertical dimension of wall 14, through which liquid passes to a lower fractionation stage, here tray 30. Associated with the metering chamber is a liquid level monitoring and control means 16 which provides a signal that, in the embodiment shown, directs the operation of control valve 11 to pass a reflux of a controlled, for example, constant flowrate.

Figure 2:
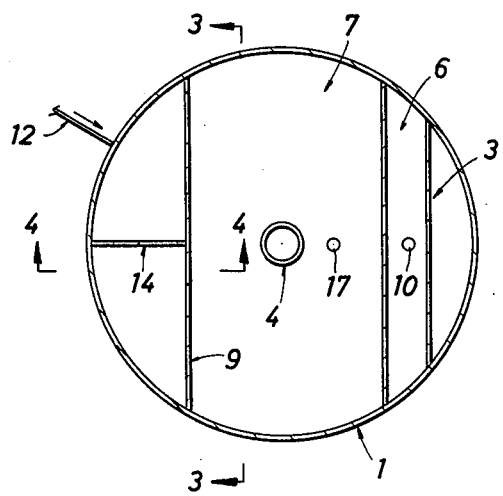
FIG. 2 is a top sectional view of the receiver and metering chamber from line 2—2 of FIG. 1
Figure 3:
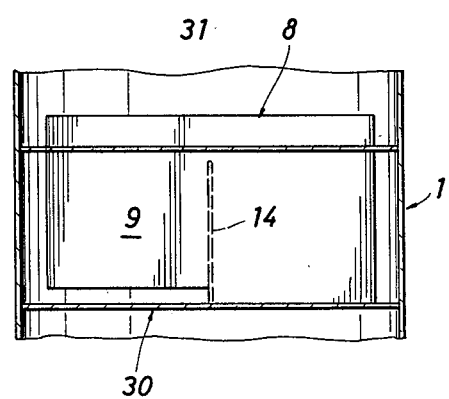
FIG. 3 is a side sectional view of the metering chamber from line 3—3 of FIG. 2.
Figure 4:
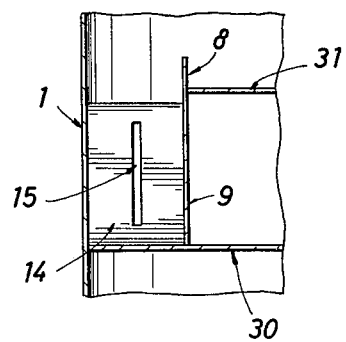
FIG. 4 is a side sectional view of the metering chamber from line 4—4 of FIG. 2.

FIGS. 2 and 3 particularly illustrate the disposition of the metering chamber 13 within the space defined by the column wall 1 and the overflow downcomer 9. In the embodiment of the invention depicted, a third vertical wall, 14, defining the metering chamber is shown as viewed from the top and from the center of the column in FIGS. 2 and 3, respectively. FIG. 4 indicates orifice slit 15 in wall 14.

The Figures depict an application of the invention to a conventional distillation column containing single-pass fractionating trays. Appropriate arrangements of elements of the invention will permit the application to multipass trays.

We claim as our invention:

1. In combination with a multi-stage countercurrent distillation column having an upper fractionation stage above a withdrawal outlet for use in withdrawing a liquid side draw from the column and a lower fractionation stage below said withdrawal outlet, an apparatus, for dividing a liquid source into a reflux portion of measured and controlled flowrate that passes by gravity flow to the lower fractionation stage, and a side stream portion that is withdrawn from the distillation column through said withdrawal outlet, which apparatus comprises
  (a) a liquid reflux reservoir adapted to collect said liquid source, said reservoir positioned at an elevation intermediate to that of the upper and the lower fractionation stages, said reflux reservoir having in association therewith (b) means for maintaining a liquid level within the reflux reservoir, said reflux reservoir being in liquid communication with said withdrawal outlet via
  (c) flow passage means adapted to direct the side stream portion of the liquid source to the withdrawal outlet, and said reflux reservoir being in liquid communication, through (d) first liquid conduit means, with
  (e) control valve means adapted to pass a controlled flowrate of said reflux portion of the liquid source, via (f) second liquid conduit means, to
  (g) a metering chamber positioned at an elevation below the reflux reservoir, said chamber having (h) at least one flow orifice through which passes the reflux portion to the lower fractionation stage, and said chamber having in association therewith (i) liquid level measuring means for monitoring of liquid level in the chamber.

2. In combination with a multi-stage countercurrent distillation column having an upper fractionation stage above a withdrawal outlet for use in withdrawing a liquid side draw from the column and a lower fractionation stage below said withdrawal outlet, an apparatus, for dividing a liquid source into a reflux portion of measured and controlled flowrate that passes by gravity flow to the lower fractionation stage, and a side stream portion that is withdrawn from the distillation column through said withdrawal outlet, which apparatus comprises (a) a liquid receiver transversely divided by a reflux weir into a reflux reservoir and a side stream reservoir, (b) a means for directing a portion of the liquid traffic flowing down the distillation column from the fractionation stage above the side stream outlet into the reflux reservoir of the receiver, said portion being of greater flowrate than the reflux flow, and for directing liquid traffic with the exception of said portion into the side stream reservoir of the receiver, (c) a control valve means positioned external to the column at a vertical elevation below that of the top of the reflux weir, (d) a first liquid conduit extending from the reflux reservoir to the control valve means, (e) a metering chamber positioned at a vertical elevation below the top of the reflux weir, said chamber having one or more flow orifices in liquid communication with the lower fractionation stage, (f) a means for measuring liquid level in the metering chamber, (g) a second liquid conduit extending from the control valve means to the metering chamber, and (h) a means for communicating side stream liquid from the side stream reservoir of the receiver to the side stream withdrawal outlet of the distillation column.

3. In combination with a multi-stage countercurrent distillation column having an upper fractionation stage above a withdrawal outlet for use in withdrawing a liquid side draw from the column and a lower fractionation stage below said withdrawal outlet, an apparatus, for dividing a liquid source into a reflux portion of measured and controlled flowrate that passes by gravity flow to the lower fractionation stage, and a side stream portion that is withdrawn from the distillation column through said withdrawal outlet, which apparatus comprises (a) a liquid receiver transversely divided by a reflux weir into a reflux reservoir and a side stream reservoir, (b) a means for directing all liquid traffic flowing down the distillation column from the fractionation stage above the side stream outlet into the reflux reservoir of the receiver, (c) a control valve means positioned external to the column at a vertical elevation below that of the top of the reflux weir, (d) a first liquid conduit extending from the reflux reservoir to the control valve means, (e) a metering chamber positioned at a vertical elevation below the top of the reflux weir, said chamber having one or more flow orifices in liquid communication with the lower fractionation stage, (f) a means for measuring liquid level in the metering chamber, (g) a second liquid conduit extending from the control valve means to the metering chamber, and (h) a means for communicating side stream liquid from the side stream reservoir of the receiver to the side stream withdrawal outlet of the distillation column.

4. The apparatus according to any one of claims 1, 2 and 3, wherein the receiver and the metering chamber are contained within the distillation column walls.

5. The apparatus according to claim 4, wherein the flow orifices are located in one or more side walls of the metering chamber.

6. The apparatus according to claim 4, wherein the receiver is a draw tray equipped with transverse weir, vapor chimney, and overflow downcomer.

7. The apparatus according to claim 6, wherein the metering chamber is disposed in a space defined by the wall of the distillation column and the overflow downcomer.

8. The apparatus according to claim 4, wherein the control valve means is adapted to respond automatically to a control signal generated by an operating parameter of the distillation column.

9. The apparatus according to claim 8, wherein the means for measurement of liquid level in the metering chamber also serves a control function by generating signals in response to which the control valve means is automatically operated to maintain an essentially constant liquid level in the metering chamber.

* * * * *